United States Patent
Kao et al.

(10) Patent No.: US 11,089,337 B2
(45) Date of Patent: *Aug. 10, 2021

(54) METHODS AND APPARATUS FOR IN-LOOP DE-ARTIFACT FILTERING

(71) Applicant: INTERDIGITAL VC HOLDINGS, INC., Wilmington, DE (US)

(72) Inventors: Meng-Ping Kao, La Jolla, CA (US); Peng Yin, Ithaca, NY (US); Oscar Divorra Escoda, Barcelona (ES)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,462

(22) Filed: May 3, 2017

(65) Prior Publication Data
US 2017/0238021 A1    Aug. 17, 2017

Related U.S. Application Data

(63) Continuation of application No. 14/981,345, filed on Dec. 28, 2015, now Pat. No. 9,674,556, which is a
(Continued)

(51) Int. Cl.
*G06K 9/36* (2006.01)
*G06K 9/46* (2006.01)
(Continued)

(52) U.S. Cl.
CPC ........... *H04N 19/86* (2014.11); *H04N 19/117* (2014.11); *H04N 19/124* (2014.11);
(Continued)

(58) Field of Classification Search
CPC ..... G06T 5/001; G06T 5/002; H04N 7/26888; H04N 7/50; H04N 7/26244; H04N 7/64;
(Continued)

(56) References Cited

U.S. PATENT DOCUMENTS 5,515,111 A    5/1996  Guedalia
5,541,852 A    6/1996  Eyuboglu et al.
(Continued)

FOREIGN PATENT DOCUMENTS

CN    1132972 A    10/1996
CN    1136374 A    11/1996
(Continued)

OTHER PUBLICATIONS

M. Welling et al."Learning Sparse Topographic Representations with Products of Student-t Distributions", Advances in neural information, 2003, pp. 1-8.*
(Continued)

*Primary Examiner* — Samir A Ahmed
(74) *Attorney, Agent, or Firm* — Invention Mine LLC

(57) ABSTRACT

There are provided methods and apparatus for in-loop artifact filtering. An apparatus includes an encoder for encoding an image region. The encoder has at least two filters for successively performing in-loop filtering to respectively reduce at least a first and a second type of quantization artifact.

18 Claims, 7 Drawing Sheets

Related U.S. Application Data continuation of application No. 12/312,386, filed as application No. PCT/IS2007/022795 on Oct. 25, 2007, now Pat. No. 9,277,243.

(60) Provisional application No. 60/864,917, filed on Nov. 8, 2006.

(51) Int. Cl.

| | |
|---|---|
| *H04N 19/86* | (2014.01) |
| *H04N 19/159* | (2014.01) |
| *H04N 19/176* | (2014.01) |
| *H04N 19/70* | (2014.01) |
| *H04N 19/46* | (2014.01) |
| *H04N 19/61* | (2014.01) |
| *H04N 19/117* | (2014.01) |
| *H04N 19/126* | (2014.01) |
| *H04N 19/154* | (2014.01) |
| *H04N 19/174* | (2014.01) |
| *H04N 19/44* | (2014.01) |
| *H04N 19/82* | (2014.01) |
| *H04N 19/124* | (2014.01) |
| *H04N 19/80* | (2014.01) |

(52) U.S. Cl.
CPC ......... *H04N 19/126* (2014.11); *H04N 19/154* (2014.11); *H04N 19/159* (2014.11); *H04N 19/174* (2014.11); *H04N 19/176* (2014.11); *H04N 19/44* (2014.11); *H04N 19/46* (2014.11); *H04N 19/61* (2014.11); *H04N 19/70* (2014.11); *H04N 19/80* (2014.11); *H04N 19/82* (2014.11)

(58) Field of Classification Search
CPC .. H04N 7/26276; H04N 19/86; H04N 19/124; H04N 19/80; H04N 19/159; H04N 19/176; H04N 19/70; H04N 19/46; H04N 19/61; H04N 19/117; H04N 19/126; H04N 19/154; H04N 19/174; H04N 19/44; H04N 19/82
USPC ............ 382/232, 236, 238, 251; 375/240.02, 375/240.03, 240.12, 240.13, 240.27
See application file for complete search history.

(56) References Cited

U.S. PATENT DOCUMENTS

| | | | |
|---|---|---|---|
| 5,590,064 | A | 12/1996 | Astle |
| 5,757,976 | A | 5/1998 | Shu |
| 5,877,813 | A | 3/1999 | Lee et al. |
| 5,903,679 | A | 5/1999 | Park |
| 6,029,125 | A | 2/2000 | Hagen et al. |
| 6,178,205 | B1 | 1/2001 | Cheung et al. |
| 6,665,346 | B1 | 12/2003 | Lee et al. |
| 6,741,665 | B2 | 5/2004 | Kenney et al. |
| 6,807,317 | B2 | 10/2004 | Mathew et al. |
| 6,909,745 | B1 | 6/2005 | Puri et al. |
| 6,931,063 | B2 | 8/2005 | Sun et al. |
| 7,136,536 | B2 | 11/2006 | Andersson et al. |
| 7,136,538 | B2 | 11/2006 | Kitagawa |
| 7,272,186 | B2 | 9/2007 | Hong |
| 7,551,232 | B2 | 6/2009 | Winger et al. |
| 7,570,182 | B2 | 8/2009 | Sheba et al. |
| 7,822,125 | B2 | 10/2010 | Bjontegaard |
| 7,924,925 | B2 | 4/2011 | He |
| 8,023,562 | B2 | 9/2011 | Iheludkov et al. |
| 8,135,234 | B2 | 3/2012 | Tourapis et al. |
| 8,218,655 | B2 | 7/2012 | Tourapis et al. |
| 8,537,903 | B2 | 9/2013 | Lim |
| 9,277,243 | B2 | 3/2016 | Kao et al. |
| 9,674,556 | B2 * | 6/2017 | Kao ..................... H04N 19/159 |
| 2002/0080882 | A1 | 6/2002 | Kitagawa |
| 2002/0136303 | A1 | 9/2002 | Sun et al. |
| 2003/0202581 | A1 | 10/2003 | Taku |
| 2003/0219073 | A1 | 11/2003 | Lee et al. |
| 2003/0235258 | A1 | 12/2003 | Kenney et al. |
| 2004/0240545 | A1 | 12/2004 | Guleryuz |
| 2005/0190843 | A1 | 9/2005 | Lee |
| 2006/0007999 | A1 | 1/2006 | Gomez et al. |
| 2006/0078048 | A1 | 4/2006 | Bjontegaard |
| 2006/0153301 | A1 | 7/2006 | Guleryuz |
| 2006/0233253 | A1 | 10/2006 | Shi et al. |
| 2007/0140574 | A1 | 6/2007 | Yamaguchi et al. |
| 2008/0151101 | A1 | 6/2008 | Tian et al. |
| 2010/0150229 | A1 | 6/2010 | Francois et al. |
| 2011/0116549 | A1 | 5/2011 | Sun |
| 2012/0213276 | A1 | 8/2012 | Hagai et al. |
| 2013/0077693 | A1 | 3/2013 | Demos |

FOREIGN PATENT DOCUMENTS

| | | |
|---|---|---|
| CN | 1276898 | 12/2000 |
| CN | 1486090 | 3/2004 |
| CN | 1571515 | 1/2005 |
| CN | 1599459 | 3/2005 |
| CN | 1663258 | 8/2005 |
| CN | 1767656 A | 5/2006 |
| CN | 1816149 | 8/2006 |
| EP | 0772365 | 5/1997 |
| EP | 0781053 | 6/1997 |
| JP | 200059769 | 2/2000 |
| JP | 2003179933 | 6/2003 |

OTHER PUBLICATIONS

Jiang: "Adaptive Rate Control for Advanced Video Coding", Santa Clara University Department of Computer Engineering, Jan. 25, 2006, pp. 1-153.
Kalva Etal: "Complexity Estimation of the H264 Coded Video Bitstreams", Department of Computer and Engineering, Florida Atlantic University, Boca Raton, FL. The computer journal vol. 48, No. 5, 2005, pp. 504-513.
Ostermann Etal: "Video coding with H264 AVC: Tools, Performance, and Complexity" IEEE Circuits and Systems Magazine, First Quarter 2004, pp. 7-28.
Wiegand_ETAL: Overview of the H264 AVC Video Coding Standard, IEEE Transactions on Circuits and Systems for Video Technology, vol. 13, No. 7, Jul. 2003.
Yadav: Optimization of the Deblocking Filter in H264 Codec for Real Time Implementation, The University of Texas at Arlington, May 2006.
PCT Search Report from ISA/EP dated Dec. 23, 2008.
Fan et al.: JPEG decompression with reduced artifacts Journal of the American Veterinary Medical Association, vol. 2186, Feb. 9, 1994, pp. 50-55, ISSN: 0003-1488 pag3 53, paragraph 2.2.
Lee et al.: Loop filtering and post filtering for low bit-rates moving picture coding Image processing, 1999, ICIP 99. Proceedings 1999 International conference on Kobe, Japan Oct. 24-28, 1999, vol. 1, Oct. 24, 1999, pp. 94-98.
Park et al., "Theory of Projection onto the Narrow Quantization Constraint Set and Its Application", IEEE Transactions on Image Processing, vol. 3, No. 10, Oct. 1999.
ITU-T H.261 Line transmission of non telephone signals, Video codec for audiovisual services AT px64kbits; Mar. 1993, pp. I, 1-25, XP55224103.
ITU-T H264: "Advanced video coding for generic audiovisual services", May 2005.
Guleryuz et al.: "A Nonlinear Loop Filter for Quantization Noise Removal in Hybrid Video Compression," Proc. IEEE Int'l Conf. on Image Proc. (ICIP2005, Genova, Italy. 2005).
ITU-T H.264: Audiovisual and Multimedia Systems, Nov. 2007.
Shang etal: "Image feature extraction and denoising based on sparse coding", Journal of system simulation, Jul. 31, 2005.

(56) References Cited

OTHER PUBLICATIONS

Shang etal: "Natural image denoising method based on non-negative sparse coding shrinkage", Journal of university of SCIENCE and Technology of China May 31, 2006.

* cited by examiner

METHODS AND APPARATUS FOR IN-LOOP DE-ARTIFACT FILTERING

CROSS-REFERENCE TO APPLICATIONS

This application is a continuation application of U.S. Non-Provisional patent application Ser. No. 14/981,345, filed Dec. 28, 2015, which is itself a continuation application of Ser. No. 12/312,386 filed May 7, 2009, which was patented on Mar. 1, 2016, U.S. Pat. No. 9,277,243, which claims the benefit under 35 U.S.C. § 365 of International Application PCT/US2007/022795, filed Oct. 25, 2007, which claims the benefit of U.S. Provisional Patent Application Ser. No. 60/864,917 filed Nov. 8, 2006; and all of which are incorporated by reference herein in their respective entireties.

TECHNICAL FIELD

The present principles relate generally to video encoding and decoding and, more particularly, to methods and apparatus for in-loop de-artifact filtering.

BACKGROUND

All video compression artifacts result from quantization, which is the only lossy coding part in a hybrid video coding framework. However, those artifacts can be present in various forms such as, for example, as a blocky artifact, a ringing artifact, an edge distortion, and/or texture corruption. In general, the decoded sequence may be composed of all types of visual artifacts, but with different severances. Among the different types of visual artifacts, blocky artifacts are common in block-based video coding. These artifacts can originate from both the block-based transform stage in residue coding and from the motion compensation stage. Adaptive deblocking filters have been studied in the past and some well-known deblocking filtering methods have been proposed and adopted in various standards (such as those adopted in, for example, the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"). When designed well, a deblocking filter can improve both objective and subjective video quality. In state of the art video encoders and/or decoders such as, for example, those corresponding to the MPEG-4 AVC Standard, an adaptive in-loop deblocking filter is designed to reduce blocky artifacts, wherein the strength of filtering is controlled by the values of several syntax elements. The basic idea is that if a relatively large absolute difference between samples near a block edge is measured, that difference is likely a blocking artifact and should thus be reduced. However, if the magnitude of that difference is so large that it cannot be explained by the coarseness of the quantization used in the encoding, the edge is more likely to reflect the actual behavior of the source picture and should not be smoothed over. In this way, the blockiness of the content is reduced, while the sharpness of the content is basically unchanged. The deblocking filter is adaptive on several levels. On the slice level, the global filtering strength can be adjusted to the individual characteristics of the video sequence. On the block-edge level, filtering strength is made dependent on the inter/intra prediction decision, motion differences, and the presence of coded residuals in the two neighboring blocks. On macroblock boundaries, special strong filtering is applied to remove "tiling artifacts". On the sample level, sample values and quantizer-dependent thresholds can turn off filtering for each individual sample.

Deblocking filtering in accordance with the MPEG-4 AVC Standard is well designed to reduce the blocky artifact, but it does not try to correct other artifacts caused by quantization noise. For example, deblocking filtering in accordance with the MPEG-4 AVC Standard leaves edges and textures untouched. Thus, it cannot improve distorted edges or texture. One reason for this lack of capability is that the MPEG-4 AVC Standard deblocking filter applies a smooth image model and the designed filters typically include a bank of low-pass filters. However, images include many singularities, texture, and so forth and, thus, they are not handled correctly by the MPEG-4 AVC Standard deblocking filter.

In order to overcome the limitations of the MPEG-4 AVC Standard deblocking filter, an approach has been recently proposed involving a de-noising type nonlinear in-loop filter. In this proposed approach, a nonlinear de-noising filter adapts to non-stationary image statistics which exploits a sparse image model using an over complete set of linear transforms and hard-thresholding. The nonlinear de-noising filter automatically becomes high-pass, or low-pass, or band-pass, and so forth, depending on the region the filter is operating on. The nonlinear de-noising filter can address all types of quantization noise. This particular de-noising approach basically includes three steps: transform; transform coefficients threshold; and inverse transform. Then several de-noised estimates provided by de-noising with an over complete set of transforms (typically produced by applying de-noising with shifted versions of the same transform) are combined using weighted averaging at every pixel.

Sparsity based de-noising tools could reduce quantization noise over video frames that include locally uniform regions (smooth, high frequency, texture, and so forth) separated by singularities. However, the de-noising tool was designed for additive, independent and identically distributed (i.i.d.) noise removal, while quantization noise has significantly different properties, which can present significant issues in terms of proper distortion reduction and visual de-artifacting. This implies that these techniques may get confused by true edges or false blocky edges. A possibility for a solution is spatio-frequential threshold adaptation, which may be able to correct the decision, but it is not trivial in its implementation. A possible consequence of inadequate threshold selection is that sparse de-noising might result into over-smoothed reconstructed pictures, or a blocky artifact(s) may still be present despite the filtering procedure. In particular, for the smooth picture regions, the signal as well as the blocky artifact added to the signal would probably have sparse representation at the filtering stage if the same transform is used for compression and denoising. So a thresholding operation would probably still keep the artifact. At present, it has been observed that sparsity based de-noising techniques, even though they present a higher distortion reduction in terms of objective measures (e.g., mean squared error (MSE)) than other techniques, they may present important visual artifacts that need to be addressed.

It has been observed that the use of a single de-noising filter is not very efficient or effective in removing coding artifacts. The reason for this is that a general purpose de-noising filter is usually based on a distortion model which does not exactly match the actual scenario to which it is applied. This model does not consider the local structure of blocky artifact. A special purpose de-artifacting filter, on the other hand, is designed to relieve a certain type of artifact. Accordingly, a special purpose de-noising filter is not sufficient to correct the rest of the quantization noises. For example, the in-loop deblocking filter used in the MPEG-4 AVC Standard is a special purpose filter which is not designed to remove the noise/artifacts at pixels away from the boundaries, within textures or to correct the distorted edges.

Turning to FIG. 1, a video encoder capable of performing video encoding in accordance with the MPEG-4 AVC standard is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, an input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

A first output of the picture-type decision module 115 is connected in signal communication with a third input of a frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and with an inverting input of the combiner 185.

Inputs of the frame ordering buffer 110 and the encoder controller 105 are available as input of the encoder 100, for receiving an input picture 101. Moreover, an input of the Supplemental Enhancement Information (SEI) inserter 130 is available as an input of the encoder 100, for receiving metadata. An output of the output buffer 135 is available as an output of the encoder 100, for outputting a bitstream.

Turning to FIG. 2, a video decoder capable of performing video decoding in accordance with the MPEG-4 AVC standard is indicated generally by the reference numeral 200.

The video decoder 200 includes an input buffer 210 having an output connected in signal communication with a first input of the entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270 and a first input of the deblocking filter 265. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, with a first input of the motion compensator 270, and with a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

SUMMARY

These and other drawbacks and disadvantages of the prior art are addressed by the present principles, which are directed to methods and apparatus for in-loop de-artifact filtering.

According to an aspect of the present principles, there is provided an apparatus. The apparatus includes an encoder for encoding an image region. The encoder has at least two filters for successively performing in-loop filtering to respectively reduce at least a first and a second type of quantization artifact.

According to another aspect of the present principles, there is provided a method. The method includes encoding an image region. The encoding step includes performing in-loop filtering to reduce at least a first and a second type of quantization artifact respectively using at least two filters in succession.

According to yet another aspect of the present principles, there is provided an apparatus. The apparatus includes a decoder for decoding an image region. The decoder has at least two filters for successively performing in-loop filtering to respectively reduce at least a first and a second type of quantization artifact.

According to still another aspect of the present principles, there is provided a method. The method includes decoding an image region. The decoding step includes performing in-loop filtering to reduce at least a first and a second type of quantization artifact respectively using at least two filters in succession.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
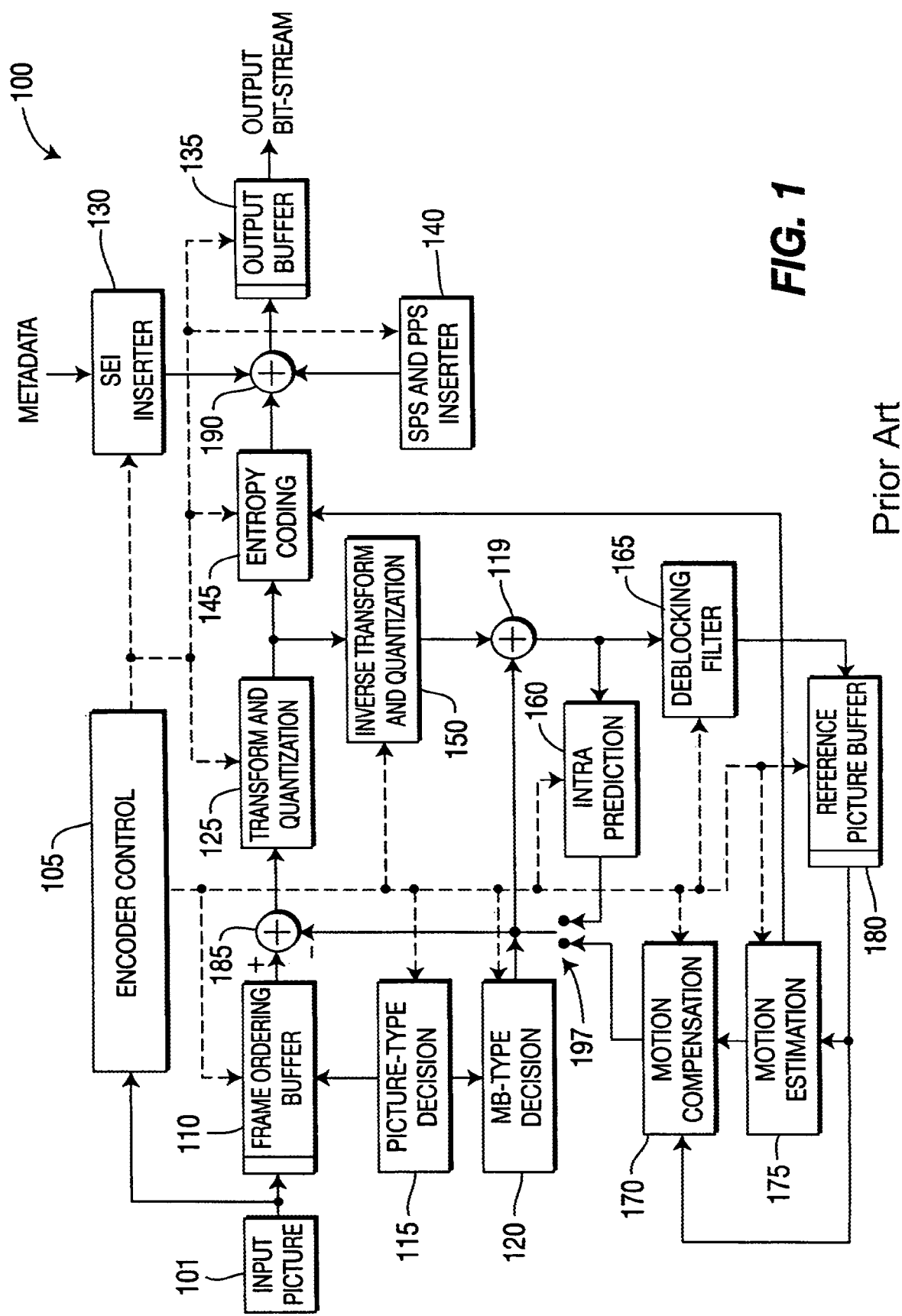
FIG. 1 shows a block diagram for a video encoder capable of performing video encoding in accordance with the MPEG-4 AVC Standard.
Figure 2:
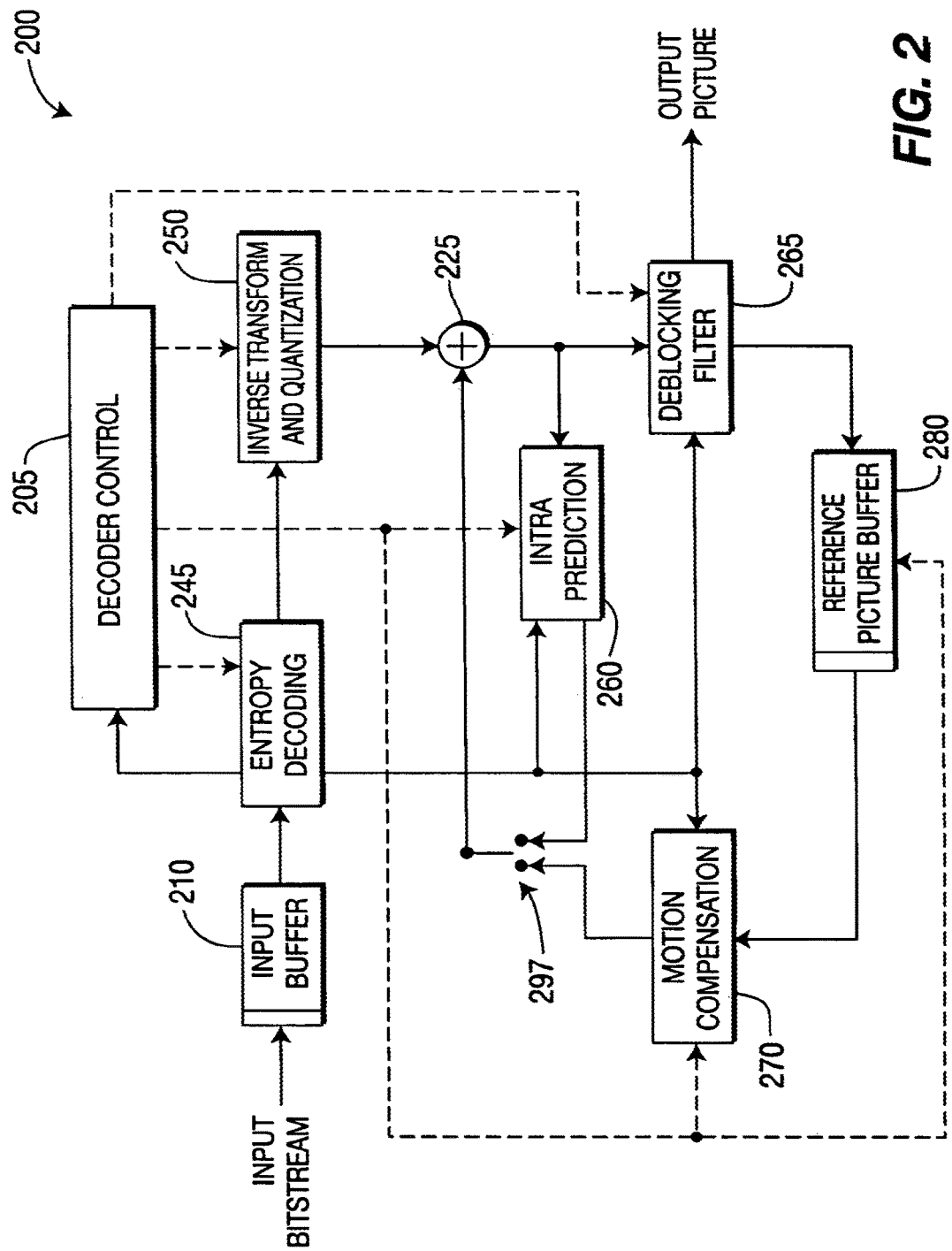
FIG. 2 shows a block diagram for a video decoder capable of performing video decoding in accordance with the MPEG-4 AVC Standard.

The present principles are directed to methods and apparatus for in-loop de-artifact filtering.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function.

The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

As used herein, "high level syntax" and "high level syntax element" interchangeably refer to syntax present in the bitstream that resides hierarchically above the macroblock layer. For example, high level syntax, as used herein, may refer to, but is not limited to, syntax at the slice header level, Supplemental Enhancement Information (SEI) level, picture parameter set level, sequence parameter set level and network abstraction layer (NAL) unit header level.

As used herein, "block level syntax" and "block level syntax element" interchangeably refer to syntax present in the bitstream that resides hierarchically at any of the possible coding units structured as a block or partitions of a block in a video coding scheme. For example, block level syntax, as used herein, may refer to, but is not limited to, syntax at the macroblock level, the 16×8 partition level, the 8×16 partition level, the 8×8 sub-block level, and general partitions of any of these. Moreover, block level syntax, as used herein, may also refer to blocks issued from the union of smaller blocks (e.g., unions of macroblocks).

The phrase "image data" is intended to refer to data corresponding to any of still images and moving images (i.e., a sequence of images including motion).

It is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions such as scalable (and non-scalable) extensions and/or multi-view (and non-multi-view) extensions of the MPEG-4 AVC standard, while maintaining the spirit of the present principles.

Figure 3:
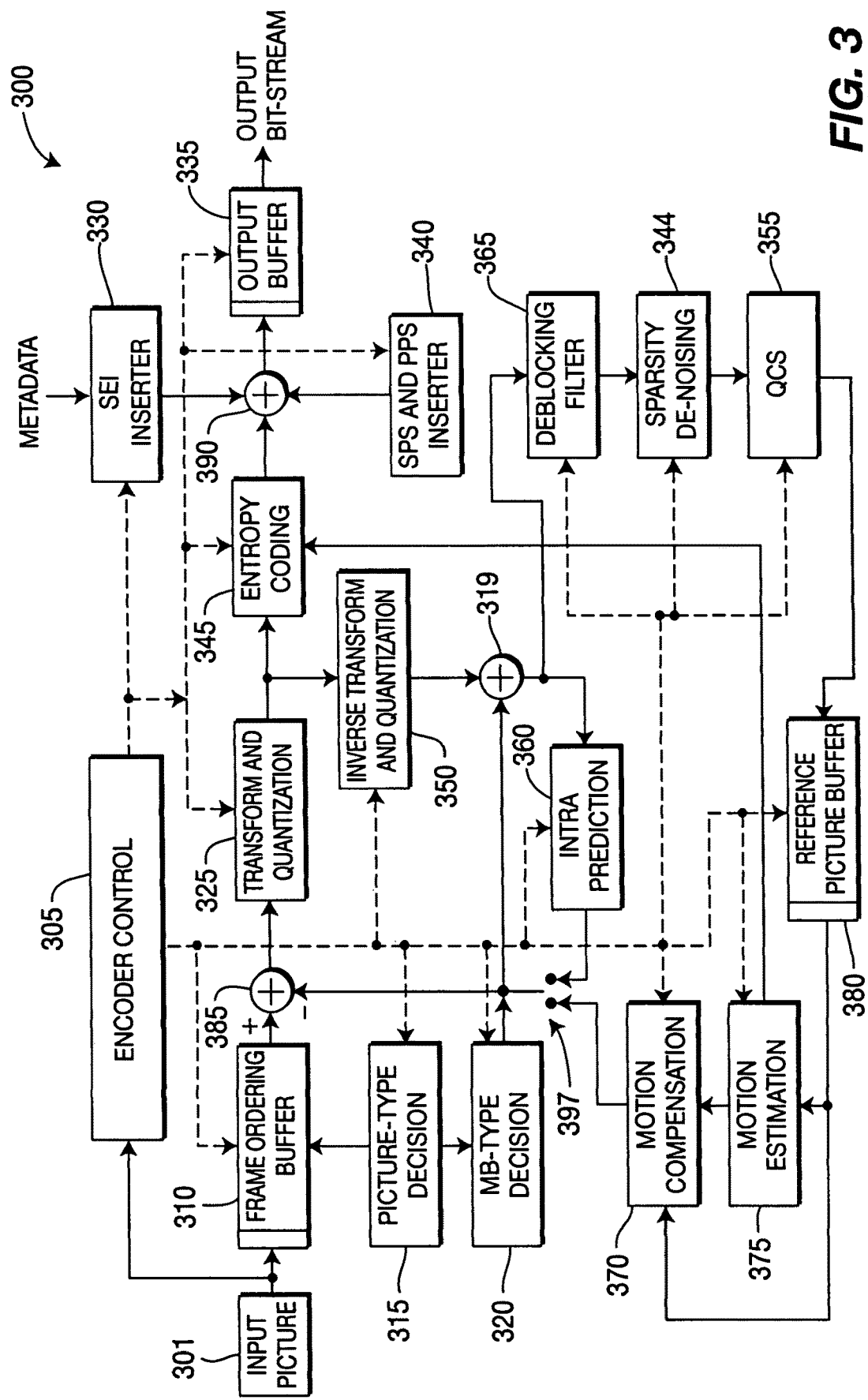
FIG. 3 shows a block diagram for a video encoder capable of performing video encoding in accordance with the MPEG-4 AVC Standard, modified and/or extended for use with the present principles, according to an embodiment of the present principles.

Turning to FIG. 3, a video encoder capable of performing video encoding in accordance with the MPEG-4 AVC standard, modified and/or extended for use with the present principles, is indicated generally by the reference numeral 300.

The video encoder 300 includes a frame ordering buffer 310 having an output in signal communication with a non-inverting input of a combiner 385. An output of the combiner 385 is connected in signal communication with a first input of a transformer and quantizer 325. An output of the transformer and quantizer 325 is connected in signal communication with a first input of an entropy coder 345 and a first input of an inverse transformer and inverse quantizer 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of a frame ordering buffer 310, a second input of the inverse transformer and inverse quantizer 350, an input of a picture-type decision module 315, a first input of a macroblock-type (MB-type) decision module 320, a second input of an intra prediction module 360, a second input of a deblocking filter 365, a first input of a motion compensator 370, a first input of a motion estimator 375, a second input of a reference picture buffer 380, a first input of a sparsity de-noising filter, and a first input of a quantization constraint set (QCS) 355.

A second output of the encoder controller 305 is connected in signal communication with a first input of a Supplemental Enhancement Information (SEI) inserter 330, a second input of the transformer and quantizer 325, a second input of the entropy coder 345, a second input of the output buffer 335, and an input of the Sequence Parameter Set (SPS) and Picture Parameter Set (PPS) inserter 340.

A first output of the picture-type decision module 315 is connected in signal communication with a third input of the frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 is connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a second input of the sparsity de-noising filter 344. An output of the sparsity de-noising filter 344 is connected in signal communication with a second input of the quantization constraint set (QCS) 355. An output of the quantization constraint set (QCS) 355 is connected in signal communication with a first input of the reference picture buffer 380. An output of the reference picture buffer 380 is connected in signal communication with a second input of the motion estimator 375 and a second input of the motion compensator 370. A first output of the motion estimator 375 is connected in signal communication with a third input of the motion compensator 370. A second output of the motion estimator 375 is connected in signal communication with a third input of the entropy coder 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and with an inverting input of the combiner 385.

Inputs of the frame ordering buffer 310 and the encoder controller 305 are available as input of the encoder 300, for receiving an input picture 301. Moreover, an input of the Supplemental Enhancement Information (SEI) inserter 330 is available as an input of the encoder 300, for receiving metadata. An output of the output buffer 335 is available as an output of the encoder 300, for outputting a bitstream.

Figure 4:
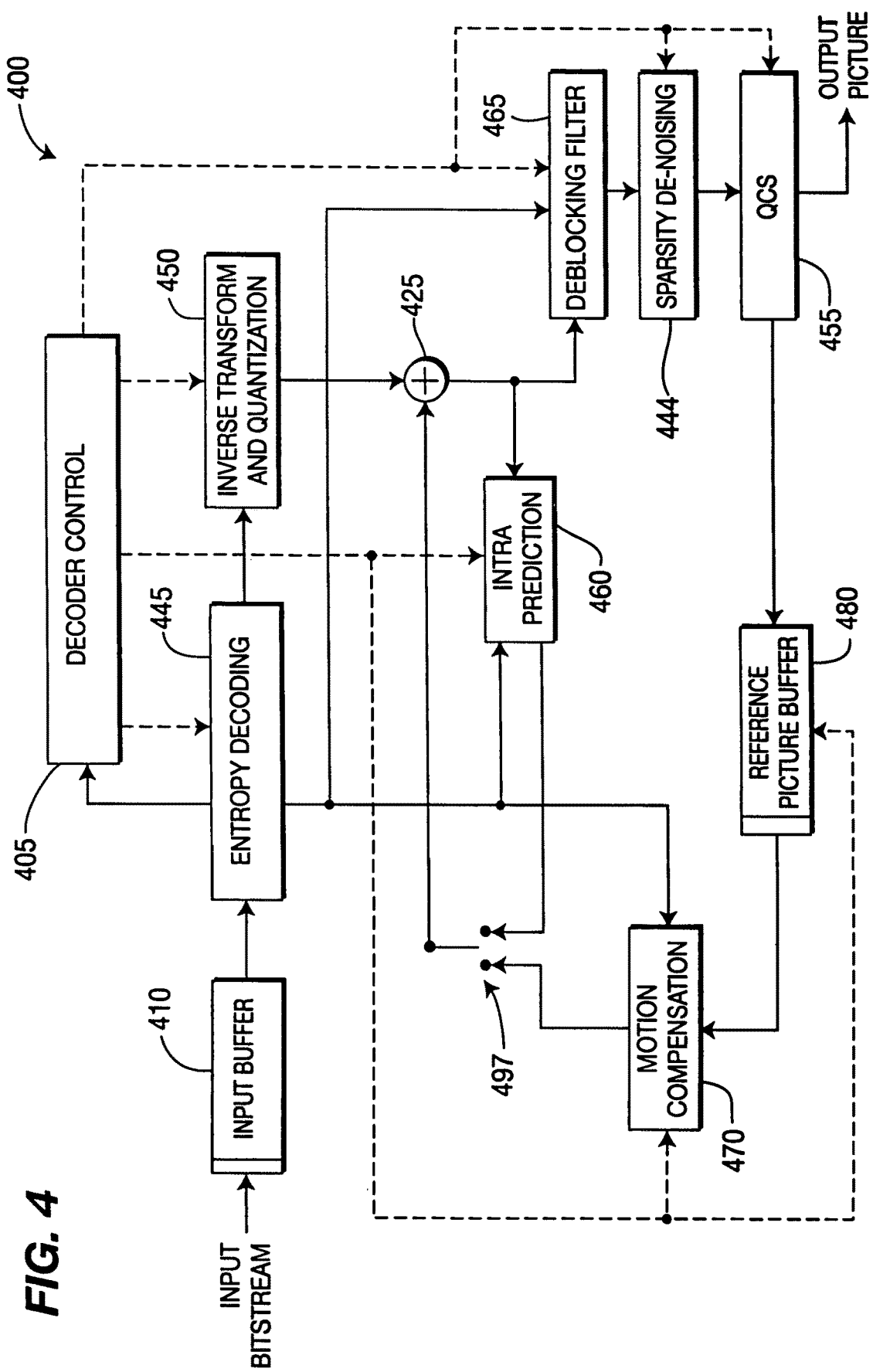
FIG. 4 shows a block diagram for a video decoder capable of performing video decoding in accordance with the MPEG-4 AVC Standard, modified and/or extended for use with the present principles, according to an embodiment of the present principles.

Turning to FIG. 4, a video decoder capable of performing video decoding in accordance with the MPEG-4 AVC standard, modified and/or extended for use with the present principles, is indicated generally by the reference numeral 400.

The video decoder 400 includes an input buffer 410 having an output connected in signal communication with a first input of the entropy decoder 445. A first output of the entropy decoder 445 is connected in signal communication with a first input of an inverse transformer and inverse quantizer 450. An output of the inverse transformer and inverse quantizer 450 is connected in signal communication with a second non-inverting input of a combiner 425. An output of the combiner 425 is connected in signal communication with a second input of a deblocking filter 465 and a first input of an intra prediction module 460. An output of the deblocking filter 465 is connected in signal communication with a first input of a sparsity de-noising filter 444. An output of the sparsity de-noising filter 444 is connected in signal communication with a first input of a quantization constraint set (QCS) 455. A first output of the quantization constraint set (QCS) 455 is connected in signal communication with a first input of a reference picture buffer 480. An output of the reference picture buffer 480 is connected in signal communication with a second input of a motion compensator 470.

A second output of the entropy decoder 445 is connected in signal communication with a third input of the motion compensator 470 and a first input of the deblocking filter 465. A third output of the entropy decoder 445 is connected in signal communication with an input of a decoder controller 405. A first output of the decoder controller 405 is connected in signal communication with a second input of the entropy decoder 445. A second output of the decoder controller 405 is connected in signal communication with a second input of the inverse transformer and inverse quantizer 450. A third output of the decoder controller 405 is connected in signal communication with a third input of the deblocking filter 465, a second input of the sparsity de-noising filter 444, and a second input of the quantization constraint set (QCS) 455. A fourth output of the decoder controller 405 is connected in signal communication with a second input of the intra prediction module 460, with a first input of the motion compensator 470, and with a second input of the reference picture buffer 480.

An output of the motion compensator 470 is connected in signal communication with a first input of a switch 497. An output of the intra prediction module 460 is connected in signal communication with a second input of the switch 497. An output of the switch 497 is connected in signal communication with a first non-inverting input of the combiner 425.

An input of the input buffer 410 is available as an input of the decoder 400, for receiving an input bitstream. A second output of the quantization constraint set (QCS) 455 is available as an output of the decoder 400, for outputting an output picture.

With respect to the video decoder 400 of FIG. 4, it is to be appreciated that we can allow output pictures before the application of function block 465, or after the application of function 465, or after application of the function block 444, or after application of the function block 455. That is, we can have the flexibility that the picture for prediction in the reference buffer and the picture for display are different, so we can have a better reference for prediction, and a sharper image for display.

As noted above, the present principles are directed to methods and apparatus for in-loop de-artifact filtering.

In an embodiment, we propose utilizing a succession of filters on coded pictures to reduce the amount of coding artifacts over video frames. The filters are placed in the coding loop (in-loop), so the filtered frames are used as referenced frames for motion compensation of subsequent coded frames. At least one of the filters includes, for example, a deblocking filter, a de-ringing filter, a de-noising filter, a signal estimation filter, a linear filter, and/or a non-linear filter.

In an embodiment, we propose using two-pass filters. In the first pass, we apply an adaptive deblocking filter, which targets removing blocking artifacts. In the second pass, we apply an adaptive sparse de-noising filter, which can further reduce quantization noise over video frames composed of locally uniform regions (smooth, high frequency, texture, and so forth). To further improve the result, we can enforce compression constraints including, but not limited to, quantization constraints, in order to help restore the image to the artifact-free form.

One or more embodiments herein involve the use of two or more in-loop filters (and/or two or more in-loop filtering passes) to remove or reduce quantization artifacts—the first filter (or filtering pass) to remove or reduce a first type (or group of types) of quantization artifact and the second filter (or filtering pass) to remove or reduce a second type (or group of types) of quantization artifact. It is to be appreciated that the use of even more in-loop filters (or filtering passes) is also contemplated in accordance with embodiments of the present principles. That is, given the teachings of the present principles provided herein, one of ordinary skill in this and related arts will contemplate these and various other implementations and variations of the present principles, while maintaining the spirit of the present principles.

Therefore, in accordance with the principles of the present invention, we suggest using a succession of filters (or filtering passes) to remove or reduce a plurality of possible coding artifact types caused by quantization. If done in this way, different kinds of artifacts and quantization errors are handled by different filters. Hence, by such cascaded filtering of reconstructed video pictures, the decoded sequence is substantially better in both subjective and objective measures. By incorporating this scheme into the encoder/decoder loop, also known as in-loop filtering, the inter prediction process can also benefit from the improvement of decoded reference pictures. Note that by using a succession of filters, we are not limited to a particular set of general or special purpose filters, a particular number of cascaded filters, or even a particular order in which they are combined. Those parameters may be adjusted based on, for example, the encoder and/or decoder to be used and the nature of the video data to be filtered. To prevent the input video signal being over processed, we can also enforce some compression and/or quantization constraints.

Figure 5:
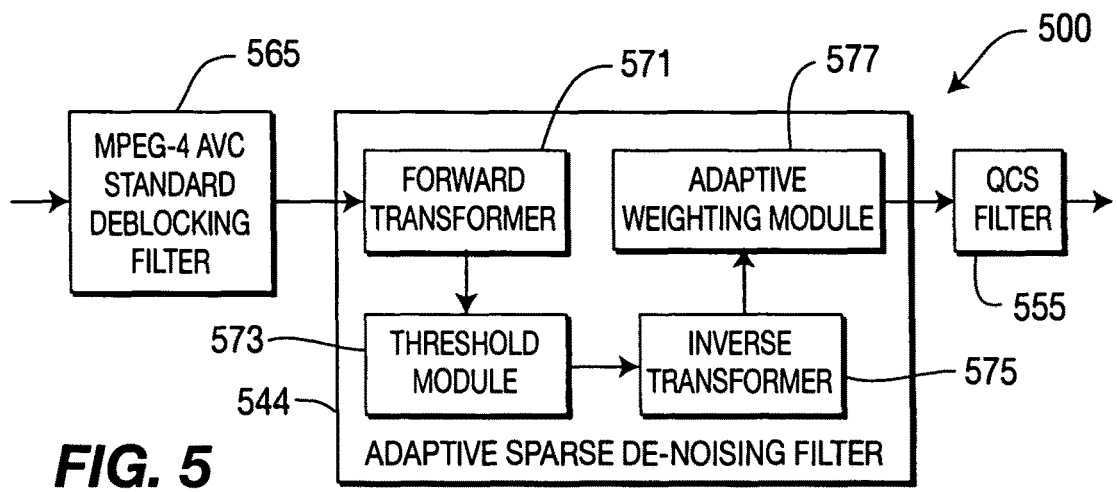
FIG. 5 shows a diagram for an exemplary succession of de-artifact filters, according to an embodiment of the present principles.

An embodiment involves the use of a "two-pass" filter. Turning to FIG. 5, an exemplary succession of de-artifact filters is indicated generally by the reference numeral 500. An adaptive sparse de-noising filter 544 is used as a refinement filter subsequent to the MPEG-4 AVC Standard deblocking filter 565 and before the quantization constraint set (QCS) filter 555. Since visual blocking artifacts are most successfully removed by the deblocking filter, the remaining quantization noise tends to become more independent and identically distributed (i.i.d.), which conforms to the noise model assumption of an adaptive sparse de-noising filter. After applying the second-pass sparse de-noising filter 544, we use the quantization constraint set filter 555 to reshape the residuals and prevent them from being over-processed. The quantization constraint set filter 555 is used to restrict each transform coefficient to its original quantization interval. This step helps prevent over-smoothing, and makes the outcome of the cascaded set of filters more robust to changes in the settings of filters including, but not limited to, changes in the thresholding parameter for the sparse-based de-noising step.

The adaptive sparse de-noising filter 544 includes a forward transformer 571 having an output in signal communication with an input of a threshold module 573. An output of the threshold module 573 is connected in signal communication with an input of an inverse transformer 575. An output of the inverse transformer 575 is connected in signal communication with an input of an adaptive weighting module 577. An input of the forward transformer is available as an input of the spare de-noising filter 544. An output of the adaptive weighting module 577 is available as an output of the spare de-noising filter 544. An output of the MPEG-4 AVC Standard deblocking filter 565 is connected in signal communication with the input of the forward transformer 571. The output of the adaptive weighting module 577 is connected in signal communication with an input of the quantization constraint set filter 555. An input of the MPEG-4 AVC Standard deblocking filter 565 is available as an input of the succession of de-artifact filters 500. An output of the quantization constraint set filter 571 is available as an output of the succession of de-artifact filters 500.

As examples, FIGS. 3 and 4 illustrate where the adaptive sparse de-noising filter and the quantization constraint set filter may be located within a video encoder structure and a video decoder structure, respectively. In the examples shown, the adaptive sparse de-noising filter and the quantization constraint set filter, one after the other, are located after the deblocking filter. Of course, given the teachings of the present principles provided herein, one of ordinary skill in this and related arts will contemplate this and other locations for the adaptive sparse de-noising filter and the quantization constraint set filter, while maintaining the spirit of the present principles.

In an embodiment, the adaptive sparse de-noising filter and/or the quantization constraint set filter can be turned on/off at the macroblock level, slice level, picture level, and/or sequence level. For example, we may choose to only apply the sparse de-noising filter and the quantization constraint set filter for intra frames, but not for inter frames.

In an embodiment, the different artifact removing/reducing steps may be selectively switched on/off depending on complexity constraints of the application, distortion measures and/or coding costs. The transform for the sparse de-noising step can be adaptively selected from a set of possible transforms. The selected transform can be indicated and signaled to the decoder using a high level syntax. A proper threshold γ can be signaled to optimize the adaptive sparse de-noising filtering. The signaled threshold γ may need to be adapted to the quantization parameter as well as to the sequence content. The optimal weighting method can also be signaled to maximize the de-noising gain.

TABLE 1 shows exemplary picture parameter set (PPS) raw byte sequence payload (RBSP) syntax for use in in-loop de-artifact filtering in accordance with an embodiment of the present principles.

TABLE 1

|  | C | Descriptor |
|---|---|---|
| pic_parameter_set_rbsp( ) { | | |
| ... | | |
|    sparse_filter_control_present_flag | 1 | u(1) |
|    qcs_control_present_flag | 1 | u(1) |
| ... | | |
| } | | |

TABLE 2 shows exemplary slice header syntax for use in in-loop de-artifact filtering in accordance with an embodiment of the present principles.

TABLE 2

|  | C | Descriptor |
|---|---|---|
| slice_header( ) { | | |
| ... | | |
|   if( sparse_filter_control_present_flag ) { | | |
|     disable_sparse_filter_flag | 2 | u(1) |
|     if( disable_sparse_filter_flag != 1 ) { | | |
|       sparse_threshold | 2 | u(v) |
|       sparse_tranform_type | 2 | u(v) |
|       adaptive_weighting_type | 2 | u(v) |
|     } | | |
|   } | | |
|   if( qcs_control_present_flag ) { | | |
|     disable_qcs_flag | 2 | u(1) |
|     if( disable_qcs_flag != 1 ) { | | |
|       qcs_pullback_model | 2 | u(v) |
|     } | | |
|   } | | |
| ... | | |
| } | | |

With respect to TABLES 1 and 2, the following exemplary syntax definitions are provided. Of course, given the teachings of the present principles provided herein, one of ordinary skill in this and related arts will contemplate these and various other syntaxes and variations thereof for use in accordance with various embodiments of the present principles, while maintaining the spirit of the present principles.

sparse_filter_control_present_flag equal to 1 specifies that a set of syntax elements controlling the characteristics of the sparse de-noising filter is present in the slice header. sparse_filter_control_present_flag equal to 0 specifies that a set of syntax elements controlling the characteristics of the sparse de-noising filter is not present in the slice header and their inferred values are in effect.

qcs_control_present_flag equal to 1 specifies that a set of syntax elements controlling the characteristics of the quantization constraint set (QCS) filter is present in the slice header. qcs_control_present_flag equal to 0 specifies that a set of syntax elements controlling the characteristics of the quantization constraint set (QCS) filter is not present in the slice header and their inferred values are in effect.

disable_sparse_filter_flag specifies whether the operation of the sparse de-noising filter shall be disabled. When disable_sparse_filter_flag is not present in the slice header, disable_sparse_filter_flag shall be inferred to be equal to 0.

sparse_threshold specifies the value of threshold used in sparse de-noising. When sparse_threshold is not present in the slice header, the default value derived based on the slice quantization parameter is used.

sparse_transform_type specifies the type of the transform used in sparse de-noising. sparse_transform_type equal to 0 specifies that a 4×4 transform is used. sparse_transform_type equal to 1 specifies that a 8×8 transform is used.

adaptive_weighting_type specifies the type of weighting used in sparse de-noising. adaptive_weighting_type equal to 0 specifies that sparsity weighting is used. adaptive_weighting_type equal to 1 specifies that average weighting is used.

disable_qcs_flag specifies whether the operation of the quantization constraint set (QCS) filter shall be disabled. When disable_qcs_flag is not present in the slice header, disable_qcs_flag shall be inferred to be equal to 0.

qcs_pullback_model specifies how to re-assign the value of coefficients. qcs_pullback_model equal to 0 specifies to pull back the coefficients to the closest cell boundary (An example of pulling back to the closet cell (or quantization bin) boundary is shown in the last row of FIG. 9, described below.). qcs_pullback_model equal to 1 specifies to pull back the coefficients to the center (also see FIG., if the quantized coefficient value is used instead) or predefined value of a cell.

In an embodiment, an adaptive sparse de-noising filter operation involves the following steps.

In one step, an over complete transform set $H_i$, $i=1, \ldots, M$ is determined. The information related to this particular set may be transmitted to the decoder. The information may be so transmitted at, for example, a slice, picture and/or sequence level. In transmitting such information, high level syntax may be embedded in the data stream. The high level syntax may be embedded, for example, at the slice, picture and/or sequence level. For example, within the framework of the MPEG-4 AVC Standard, we can reuse the existing 4×4 transform and 8×8 transform and/or the Hadamard transform step.

In another step, a threshold γ (for example, based on a quantization step and/or the statistics of the encoding picture) is determined. γ may be transmitted to the decoder. γ may be transmitted at, for example, a block, a slice, a picture and/or a sequence level. In transmitting such information, at least one block level syntax and/or at least one high level syntax may be embedded in the data stream.

In yet another step, the adaptive weighting method to combine the outcome of the inversed transforms, which may be transmitted to the decoder, is determined. The weights may be transmitted at, for example, a block a slice, picture and/or sequence level. In the event that the weighting is directly derived without explicit transmission thereof, there may still be a need to transmit some auxiliary information related to the weighting step. In transmitting any weighting step information, at least one block level syntax and/or at least one high level syntax may be embedded in the data stream. For example, average weighting or sparsity base weighting, which adapts the weights inverse of number of non-zero coefficients, can be used. Of course, the present principles are not limited to solely the preceding types of weighting and, thus, other types of weighting may also be used in accordance with the present principles, while maintaining the spirit of the present principles.

In an embodiment, an adaptive sparse de-noising filter methodology used for refinement involves obtaining the de-noised estimate $\hat{x}_i$ from each transform $H_i$ using the specified threshold γ; and combining $\hat{x}_i$ using adaptive weightings to get the final de-noised estimate $\hat{x}$.

In an embodiment, a quantization constraint set methodology is used for a last refinement step as follows:

(1) Calculate the new residual signal $\hat{r}=\hat{x}-p$, where p is the intra/inter predicted signal.

(2) Apply the same transformation process on $\hat{r}$ that the MPEG-4 AVC Standard applies on the residual. Presume that the resulting transform coefficients are $\hat{c}$.

(3) Check if $\hat{c}$ is in the quantization cell indicated by the originally received transform coefficients. For each coefficient, if after the filtering steps, $\hat{c}$ has fallen outside its original quantization cell, the new coefficient is corrected and reassigned as the closest original quantization cell boundary value to itself. Alternatively, depending on the statistics of every particular coefficient and/or quantization bin, other possible values from within the original quantization cell can be used for the reassignment procedure. The refined coefficients are denoted as c'.

(4) Take the inverse transform of c', denoted by r', and sum together with p to obtain the final estimate x'=p+r'.

The adaptive sparse de-noising filtering is directed to recovering the original signal from an independent and identically distributed (i.i.d.) noisy environment. However, the quantization noise in video compression, and particularly with respect to the MPEG-4 AVC Standard, is usually not independent and identically distributed (i.i.d.). The present principles differ from the prior art in the use of a series of refinement steps (succession of filters) after, for example, the MPEG-4 AVC Standard deblocking filter, each oriented to correct at least one part of the coding artifacts. The signal after deblocking filter is a better match to the independent and identically distributed (i.i.d.) noise presumption. The possible "over filtering problem" resulting from the use and/or combination of deblocking and de-noising filters is solved by the subsequent quantization constraint set (QCS) filter. The succession of filters has shown its superior performance in removing video compression artifacts, both in practice and theory.

Figure 6:
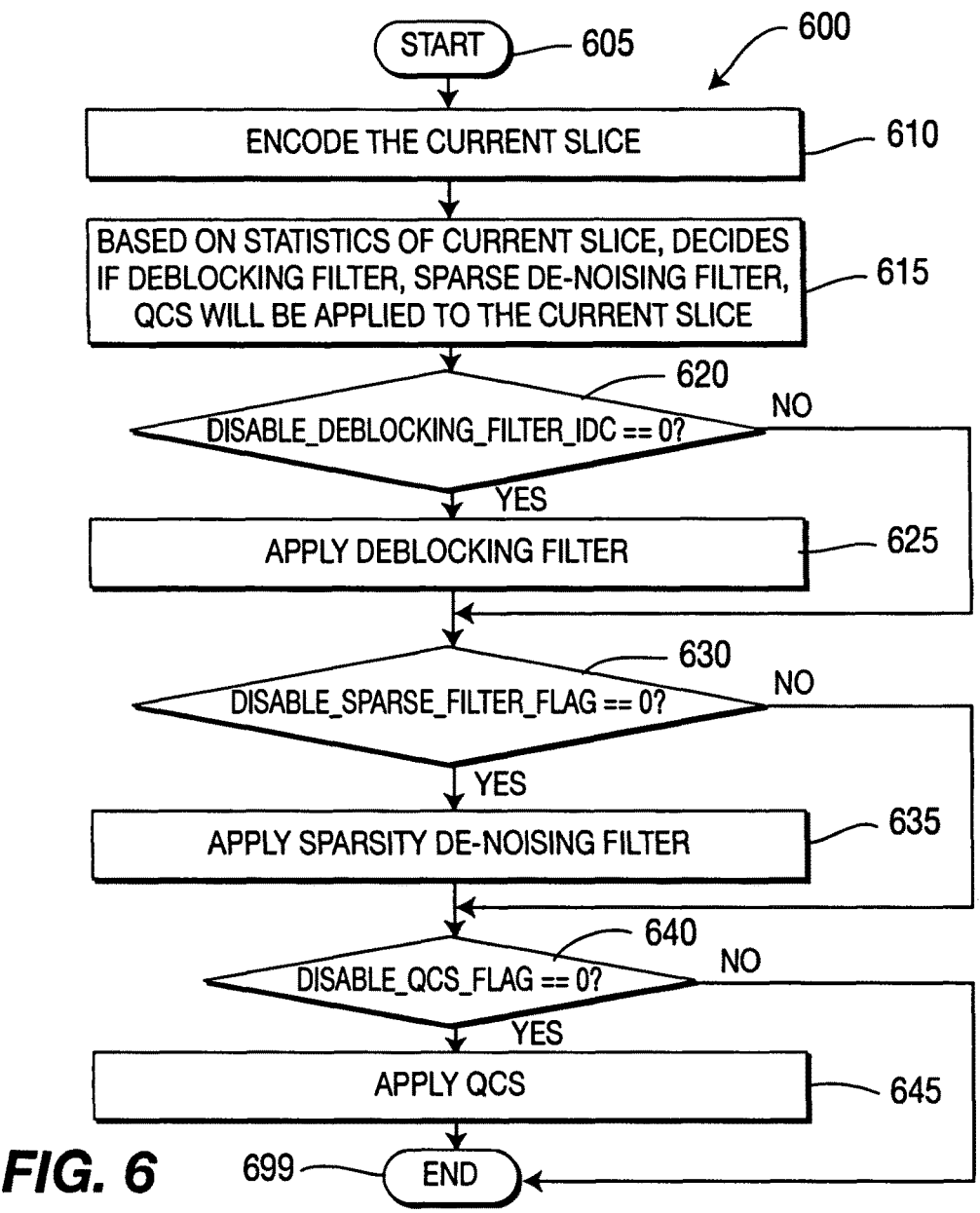
FIG. 6 shows a flow diagram for an exemplary method for encoding image data using in-loop de-artifact filtering, according to an embodiment of the present principles.

Turning to FIG. 6, an exemplary method for encoding image data using in-loop de-artifact filtering is indicated generally by the reference numeral 600.

The method 600 includes a start block 605 that passes control to a function block 610. The function block 610 encodes the current slice, and passes control to a function block 615. The function block 615 decides whether or not a deblocking filter, a sparse de-noising filter, and/or quantization constraint set (QCS) will be applied to the current slice based on statistics of the current slice, and passes control to a decision block 620. The decision block 620 determines whether or not disable_deblocking_filter_ids is equal to zero. If so, then control is passed to a function block 625. Otherwise, control is passed to a decision block 630.

The function block 625 applies a deblocking filter, and passes control to the decision block 630.

The decision block 630 determines whether or not disable_sparse_filter_flag is equal to zero. If so, then control is passed to a function block 635. Otherwise, control is passed to a decision block 640.

The function block 635 applies the sparsity de-noising filter, and passes control to the decision block 640.

The decision block 640 determines whether or not diable_qcs_flag is equal to zero. If so, then control is passed to a function block 645. Otherwise, control is passed to an end block 699.

The function block 645 applies the quantization constraint set (QCS), and passes control to the end block 699.

Figure 7:
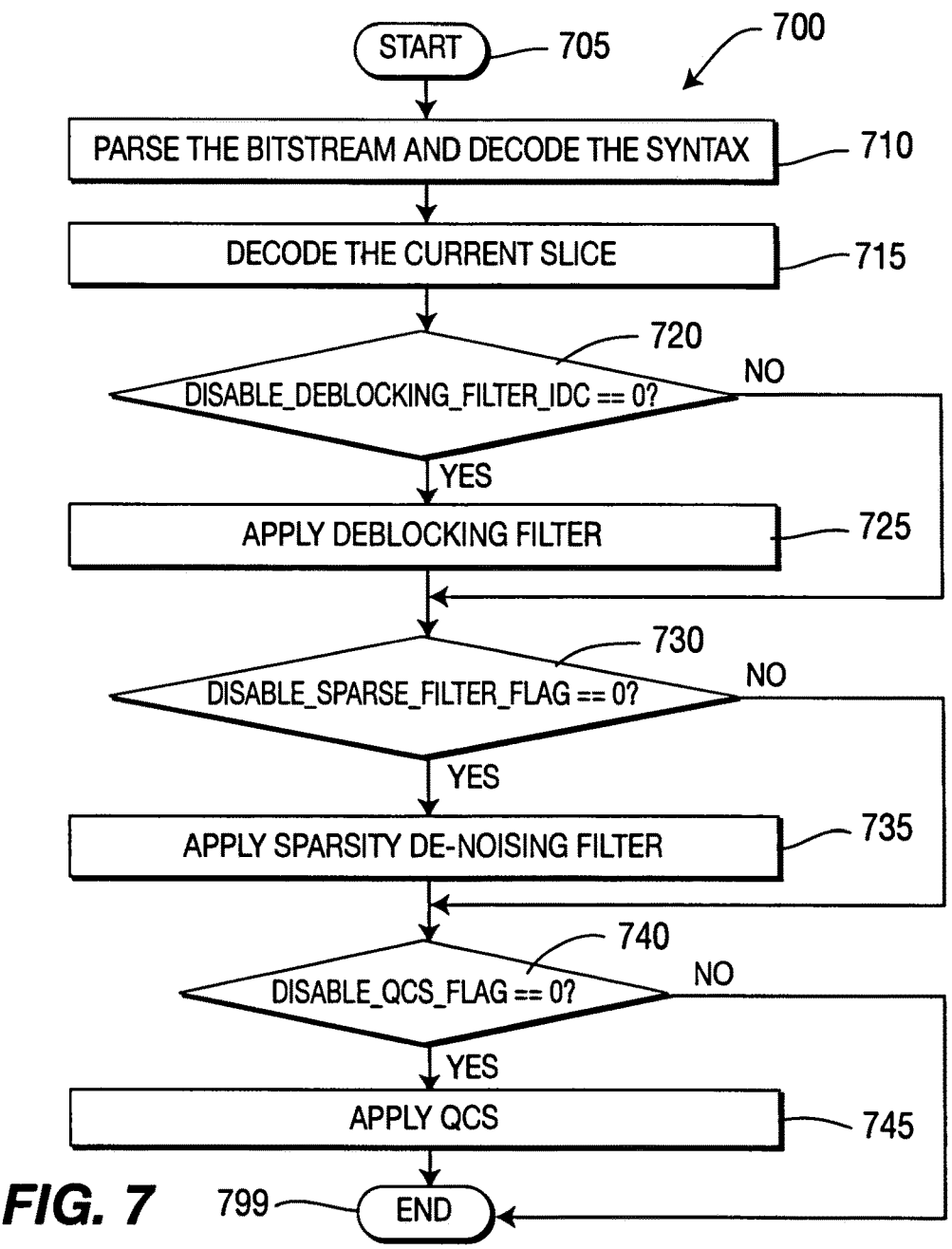
FIG. 7 shows a flow diagram for an exemplary method for decoding image data using in-loop de-artifact filtering, according to an embodiment of the present principles.

Turning to FIG. 7, an exemplary method for decoding image data using in-loop de-artifact filtering is indicated generally by the reference numeral 700.

The method 700 includes a start block 705 that passes control to a function block 710. The function block 710 parses the bitstream, decodes the syntax, and passes control to a function block 715. The function block 715 decodes the current slice, and passes control to a decision block 720. The decision block 720 determines whether or not diable_deblocking_filter_idc is equal to zero. If so, then control is passed to a function block 725. Otherwise, control is passed to a decision block 730.

The function block 725 applies the deblocking filter, and passes control to the decision block 730.

The decision block 730 determines whether or not disable_sparse_filter_flag is equal to zero. If so, then control is passed to a function block 735. Otherwise, control is passed to a decision block 740.

The function block 735 applies the sparsity de-noising filter, and passes control to the decision block 740.

The decision block 740 determines whether or not diable_qcs_flag is equal to zero. If so, then control is passed to a function block 745. Otherwise, control is passed to an end block 799.

The function block 745 applies a quantization constraint set (QCS), and passes control to the end block 799.

Figure 8:
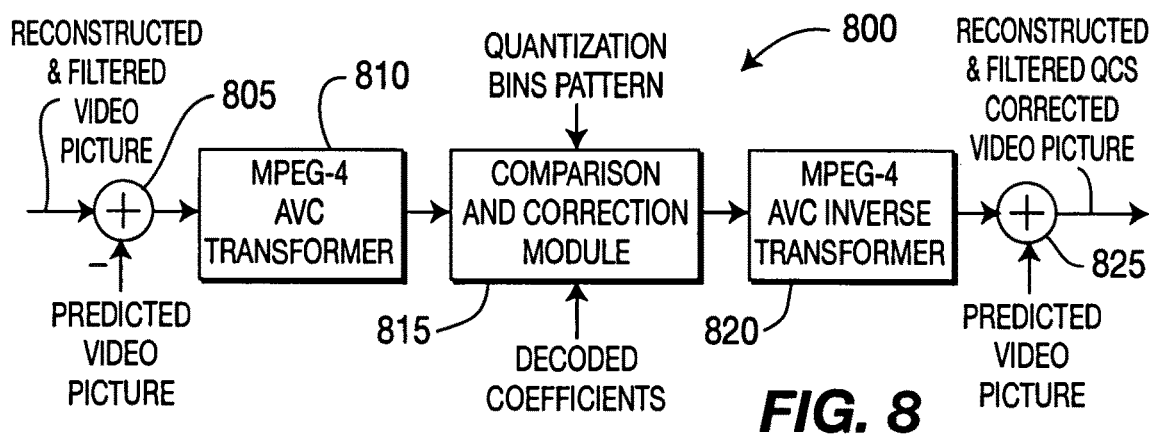
FIG. 8 shows an exemplary apparatus for performing quantization constraint set (QCS) coefficients correction after artifact removal/reduction, according to an embodiment of the present principles.

Turning to FIG. 8, an exemplary apparatus for performing quantization constraint set (QCS) coefficients correction after artifact removal/reduction is indicated generally by the reference numeral 800. The apparatus 800 includes a combiner 805 having an output in signal communication with an input of a MPEG-4 AVC transformer 810. An output of the MPEG-4 AVC Standard transformer 810 is connected in signal communication with a first input of a comparison and correction module 815. An output of the comparison and correction module 815 is connected in signal communication with an input of a MPEG-4 AVC inverse transformer 820. An output of the MPEG-4 AVC inverse transformer 820 is connected in signal communication with a first non-inverting input of a combiner 825.

A non-inverting input of the combiner 805 is available as an input of the apparatus 800, for receiving a reconstructed and filtered video picture. An inverting input of the combiner 805 is available as an input of the apparatus 800, for receiving a predicted video picture. A second input of the compare and correct module 815 is available as an input of the apparatus 800, for receiving quantization bins pattern. A third input of the compare and correct module 815 is available as an input of the apparatus 800, for receiving decoded coefficients. A second non-inverting input of the combiner 825 is available as an input of the apparatus, for receiving a predicted video picture. An output of the combiner 825 is available as an output of the apparatus, for outputting a reconstructed and filtered and quantization constraint set (QCS) corrected video picture.

The MPEG-4 AVC transformer 810 is applied to the decoded residual. The MPEG-4 AVC inverse transformer 820 is applied to the decoded residual. The compare and correct module 815 compares the decoded and filtered pictures in the transform domain and corrects the coefficients that are over-filtered.

Figure 9:
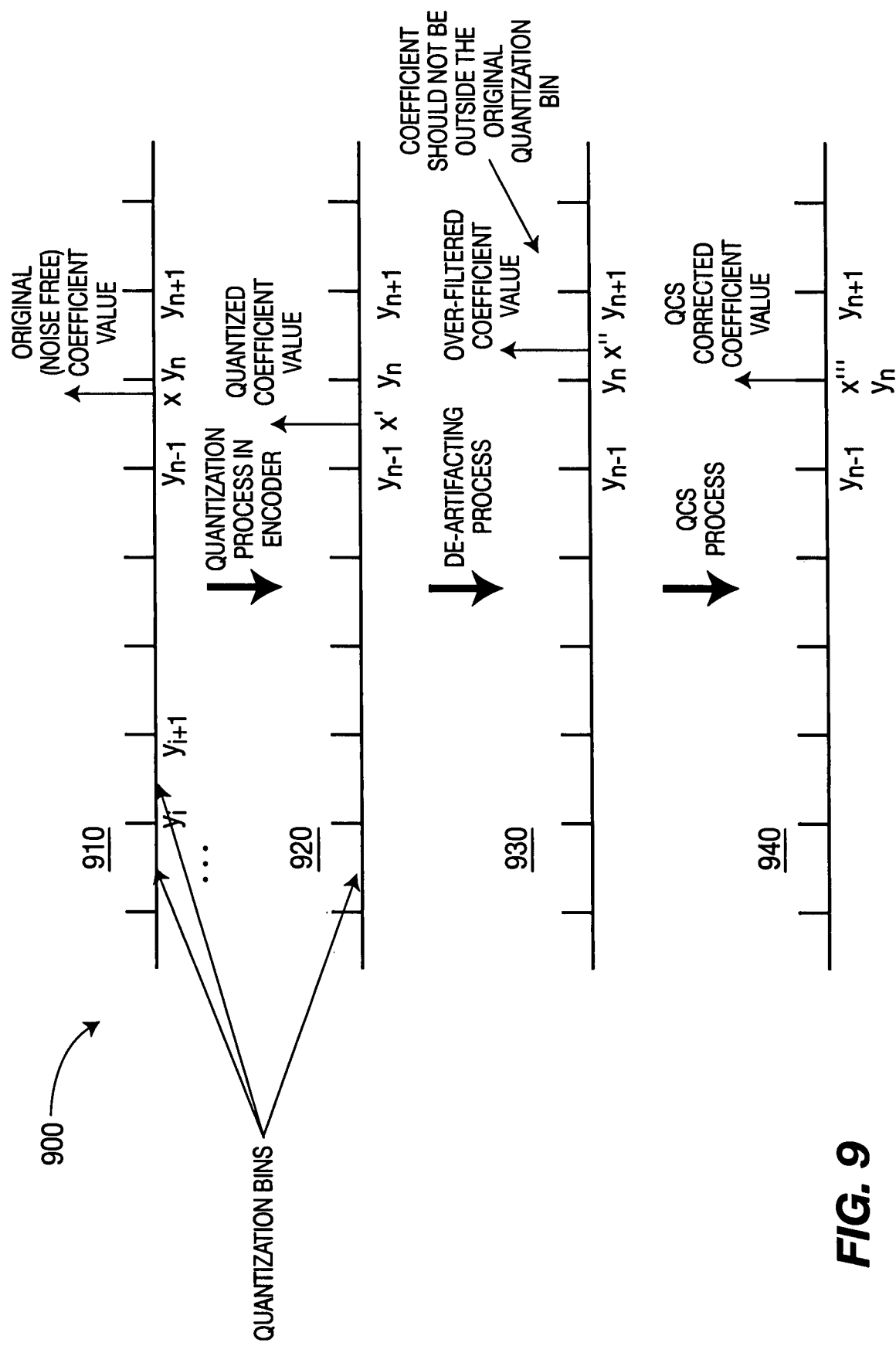
FIG. 9 shows exemplary quantization bins for an over-filtering problem and a correction approach using QCS in video encoding/decoding, according to an embodiment of the present principles.

Turning to FIG. 9, exemplary quantization bins for using QCS to correct an over-filtering problem in video encoding/decoding is indicated generally by the reference numeral 900. Presume the original value is x, and the boundary value of the quantizer is $y_i$, i=0, 1, 2 ... n, .... The particular bins are denoted by 910, 920, 930, and 940. In bin 910, x is in the quantization bin of $(y_{n-1}, y_n]$. In bin 920, after the quantization process in the encoder, the reconstruction value of x is x', which is in the quantization bin of $(y_{n-1}, y_n]$. In bin 930, after the de-artifacting process, the filtered coefficient of x is x", which is in the quantization bin of $(y_n, y_{n+1}]$. However, the coefficient should not be outside the original quantization bin, which is $(y_{n-1}, y_n]$. In bin 940, we apply the QCS process, and we set x'" equal to $y_n$, which is the final reconstructed value.

A description will now be given of some of the many attendant advantages/features of the present invention, some of which have been mentioned above. For example, one advantage/feature is an apparatus that includes an encoder for encoding an image region. The encoder has at least two filters for successively performing in-loop filtering to respectively reduce at least a first and a second type of quantization artifact.

Another advantage/feature is the apparatus having the encoder that, in turn, has at least two filters as described above, wherein at least one of the at least two filters is used to enforce at least one compression constraint.

Yet another advantage/feature is the apparatus having the encoder that, in turn, has at least two filters wherein at least one of the at least two filters is used to enforce at least one compression constraint as described above, wherein the at least one compression constraint involves a quantization constraint set.

Still another advantage/feature is the apparatus having the encoder that, in turn, has at least two filters wherein at least one of the at least two filters is used to enforce at least one compression constraint as described above, wherein at least one of, enablement information or disablement information for the at least one compression constraint and side information corresponding to the image region to adaptively indicate parameters of the at least one compression constraint, is signaled using at least one of at least one high level syntax element and at least one block level syntax element.

Moreover, another advantage/feature is the apparatus having the encoder that, in turn, has at least two filters wherein at least one of the at least two filters is used to enforce at least one compression constraint as described above, wherein parameters of the at least one compression constraint is adaptively indicated based at least in part on at least one of data characteristics and data statistics corresponding to the image region.

Further, another advantage/feature is the apparatus having the encoder that, in turn, has at least two filters as described above, wherein at least one of the at least two filters includes a deblocking filter, a de-ringing filter, a de-noising filter, a signal estimation filter, a linear filter, and a non-linear filter.

Also, another advantage/feature is the apparatus having the encoder that, in turn, has at least two filters as described above, wherein a total number, a type, and an order of implementation of the at least two filters is dynamically selectable.

Additionally, another advantage/feature is the apparatus having the encoder that, in turn, has at least two filters as described above, wherein at least one of the two or more filters is adaptively enabled or disabled depending upon at least one of data characteristics and data statistics corresponding to the image region.

Moreover, another advantage/feature is the apparatus having the encoder that, in turn, has at least two filters as described above, wherein enablement information or disablement information for at least one of the two or more filters is signaled using at least one of at least one high level syntax element and at least one block level syntax element.

Further, another advantage/feature is the apparatus having the encoder that, in turn, has at least two filters as described above, wherein the encoder transmits side information corresponding to the image region to adaptively indicate parameters of at least one of the two or more filters, the side information being transmitted at at least one of a macroblock level, a slice level, a picture level, and a sequence level.

Also, another advantage/feature is the apparatus having the encoder that transmits side information as described above, wherein the parameters of the at least one of the two or more filters are adaptively tuned based at least in part on at least one of data characteristics and data statistics corresponding to the image region.

Additionally, another advantage/feature is the apparatus having the encoder that, in turn, has at least two filters as described above, wherein the two or more filters are included in a two-pass filter, the two-pass filter having a deblocking filter for performing a first pass to reduce blocking artifacts as the first type of quantization artifact and a sparse de-noising filter for performing a second pass to reduce noise as the second type of quantization artifact.

Moreover, another advantage/feature is the apparatus having the encoder that, in turn, has at least two filters wherein the two or more filters are included in a two-pass filter as described above, wherein the encoder enforces a quantization constraint set subsequent to the second pass.

Further, another advantage/feature is the apparatus having the encoder wherein the two or more filters are included in a two-pass filter as described above, wherein the encoder signals a quantization constraint process pullback method using at least one of at least one high level syntax element and at least one block level syntax element.

Also, another advantage/feature is the apparatus having the encoder wherein the two or more filters are included in a two-pass filter as described above, wherein the encoder signals at least one of a transform type, a threshold, and a weighting method for the sparse de-noising filter in at least one of at least one high level syntax element and at least one block level syntax element.

Additionally, another advantage/feature is the apparatus having the encoder that, in turn, has at least two filters as described above, wherein the at least two filters are in-loop filters corresponding to encoding the image region, and wherein a version of the image region that is displayed is different from at least one of an output signal corresponding to the image region after the at least two in-loop filters and the initial input signal corresponding to the image region before the at least two in-loop filters.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles are not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A method comprising:
   decoding an image region, wherein the decoding includes obtaining a flag that indicates whether to enable or disable an adaptive sparse de-noising filter at a given level, the given level being at least a macroblock level, a slice level, a picture level or a sequence level, and performing in-loop filtering using at least two filters in succession, the at least two filters including a deblocking filter for performing a first pass and the adaptive sparse de-noising filter for performing a second pass, wherein the decoding of the image region selectively enables or disables the adaptive sparse de-noising filter based on the flag.

2. The method of claim 1, wherein at least one of the at least two filters is used to enforce at least one compression constraint.

3. The method of claim 1, wherein at least one of the at least two filters is adaptively enabled or disabled depending upon at least data characteristics corresponding to the image region or data statistics corresponding to the image region.

4. A non-transitory computer readable medium with instructions stored therein which, upon execution, instruct at least one processor to:
   decode an image region, wherein the decoding includes decoding a flag that indicates whether to enable or disable an adaptive sparse de-noising filter at a given level, the given level being at least a macroblock level, a slice level, a picture level or a sequence level, and perform in-loop filtering using at least two filters in succession, the at least two filters including a deblocking filter for performing a first pass and the adaptive sparse de-noising filer for performing a second pass, wherein the decoding of the image region selectively enables or disables the adaptive sparse de-noising filter based on the flag.

5. The non-transitory computer readable medium of claim 4, wherein at least one of the at least two filters is used to enforce at least one compression constraint.

6. The non-transitory computer readable medium of claim 4, wherein at least one of the at least two filters is adaptively enabled or disabled depending upon at least data characteristics corresponding to the image region or data statistics corresponding to the image region.

7. A method comprising:
receiving a signal that comprises a flag that indicates whether to enable or disable an adaptive sparse de-noising filter at a given level, the given level being at least a macroblock level, a slice level, a picture level or a sequence level; and
decoding an image region, wherein the decoding an image region includes performing in-loop filtering using at least two filters in succession, the at least two filters including a deblocking filter for performing a first pass and the adaptive sparse de-noising filter for performing a second pass, wherein the decoding of the image region selectively enables or disables the adaptive sparse de-noising filter based on said flag.

8. The method of claim 7, wherein at least one of the at least two filters is used to enforce at least one compression constraint.

9. The method of claim 7, wherein at least one of the at least two filters is adaptively enabled or disabled depending upon at least data characteristics corresponding to the image region or data statistics corresponding to the image region.

10. An apparatus comprising at least a memory and one or more processors, the one or more processors being configured to:
receive a signal that comprises a flag that indicates whether to enable or disable an adaptive sparse de-noising filter at a given level, the given level being at least a macroblock level, a slice level, a picture level or a sequence level; and
decode an image region, by performing in-loop filtering using at least two filters in succession, the at least two filters including a deblocking filter for performing a first pass and the adaptive sparse de-noising filter for performing a second pass, wherein the decoding of said image region selectively enables or disables the adaptive sparse de-noising filter based on said flag.

11. The apparatus of claim 10, wherein at least one of the at least two filters is used to enforce at least one compression constraint.

12. The apparatus of claim 10, wherein at least one of the at least two filters is adaptively enabled or disabled depending upon at least data characteristics corresponding to the image region or data statistics corresponding to the image region.

13. An apparatus comprising at least a memory and one or more processors configured to decode an image region, the one or more processors being configured to decode the image region by performing at least the following:
decode a flag that indicates whether to enable or disable an adaptive sparse de-noising filter at a given level, the given level being at least a macroblock level, a slice level, a picture level or a sequence level; and
successively perform in-loop filtering with at least two filters, the at least two filters including a deblocking filter for performing a first pass and the adaptive sparse de-noising filter for performing a second pass, wherein the decoding of the image region selectively enables or disables the adaptive sparse de-noising filter based on the flag.

14. The apparatus of claim 13, wherein at least one of the at least two filters is used to enforce at least one compression constraint.

15. The apparatus of claim 13, wherein at least one of the at least two filters is adaptively enabled or disabled depending upon at least data characteristics corresponding to the image region or data statistics corresponding to the image region.

16. An apparatus comprising at least a memory and one or more processors, the one or more processors being configured to:
receive a signal that comprises an image region and a flag, wherein the flag indicates whether to enable or disable an adaptive sparse de-noising filter at a given level, the given level being at least a macroblock level, a slice level, a picture level or a sequence level;
decode the flag that indicates whether to enable or disable an adaptive sparse de- noising filter at a given level, the given level being at least a macroblock level, a slice level, a picture level or a sequence level; and
decode the image region by, at least, successively performing in-loop filtering using at least two filters, the at least two filters including a deblocking filter for performing a first pass and the adaptive sparse de-noising filter for performing a second pass, wherein the decoding of the image region selectively enables or disables the adaptive sparse de-noising filter based on the flag.

17. The apparatus of claim 16, wherein at least one of the at least two filters is used to enforce at least one compression constraint.

18. The apparatus of claim 16, wherein at least one of the at least two filters is adaptively enabled or disabled depending upon at least data characteristics corresponding to the image region or data statistics corresponding to the image region.

* * * * *

UNITED STATES PATENT AND TRADEMARK OFFICE
CERTIFICATE OF CORRECTION

PATENT NO. : 11,089,337 B2
APPLICATION NO. : 15/585462
DATED : August 10, 2021
INVENTOR(S) : Kao et al.

It is certified that error appears in the above-identified patent and that said Letters Patent is hereby corrected as shown below:

On the Title Page

Page 2, item (63) Related U.S. Application Data, Line 2: replace "PCT/IS2007/022795" with --PCT/US2007/022795--.

Page 2, item (56) OTHER PUBLICATIONS, Line 20: replace "pag3" with --p.--.

Page 3, item (56) OTHER PUBLICATIONS, Lines 2-3: replace "SCI ENCE" with --SCIENCE--.

In the Specification

Column 15, Lines 1-2: replace "diable" with --disable--.

Column 15, Line 15: replace "diable" with --disable--.

Column 15, Lines 27-28: replace "diable" with --disable--.

In the Claims

Claim 4, Column 18, Line 64: replace "filer" with --filter--.

Claim 16, Column 20, Line 33: replace "de- noising" with --de-noising--.

Signed and Sealed this
Second Day of August, 2022

Katherine Kelly Vidal
*Director of the United States Patent and Trademark Office*